United States Patent [19]

Pejryd et al.

[11] Patent Number: 5,567,518
[45] Date of Patent: Oct. 22, 1996

[54] CERAMIC COMPOSITE, PARTICULARLY FOR USE AT TEMPERATURES ABOVE 1400 DEGREES CELSIUS

[75] Inventors: Lars Pejryd; Robert Lundberg, both of Trollhattan, Sweden; Edwin Butler, Little Shrewley, Great Britain

[73] Assignees: Volvo Aero Corporation, Trollhattan, Sweden; Rolls Royce PLC, Bristol, England

[21] Appl. No.: 331,630
[22] PCT Filed: May 7, 1992
[86] PCT No.: PCT/SE92/00297
    § 371 Date: Apr. 13, 1995
    § 102(e) Date: Apr. 13, 1995
[87] PCT Pub. No.: WO93/22258
    PCT Pub. Date: Nov. 11, 1993
[51] Int. Cl.$^6$ ..................................................... B32B 18/00
[52] U.S. Cl. .................... 428/378; 428/384; 428/697; 428/699; 428/701; 428/702
[58] Field of Search .................... 428/688, 689, 428/697, 699, 701, 702, 364, 378, 379, 384, 902; 106/286.1, 286.2, 286.5, 286.8

[56] References Cited

U.S. PATENT DOCUMENTS

| | | | |
|---|---|---|---|
| 4,298,385 | 11/1981 | Claussen et al. | 501/105 |
| 4,767,727 | 8/1988 | Claussen et al. | 501/87 |
| 5,017,528 | 5/1991 | Tiegs et al. | 501/95 |
| 5,110,771 | 5/1992 | Carpenter et al. | 501/95 |
| 5,137,852 | 8/1992 | Morgan | 501/95 |
| 5,190,820 | 3/1993 | Millard | 428/378 |
| 5,231,061 | 7/1993 | Devore | 501/95 |

FOREIGN PATENT DOCUMENTS 0202504  11/1986  European Pat. Off. .

*Primary Examiner*—Ellis Robinson
*Assistant Examiner*—Leonidas J. Jones, III
*Attorney, Agent, or Firm*—Pollock, Vande Sande & Priddy

[57] ABSTRACT

A ceramic composite material comprising matrix material, reinforcing fibers and an intermediate interface material. The matrix material and reinforcing fibers consist of the same or different ceramic oxides having a melting point above 1600° C. The interface material is applied as a coating on the fibers and consists of at least one ceramic oxide not exhibiting solid solubility, eutecticum below the temperature of manufacture or use or reactivity with any of the matrix or reinforcing materials. The matrix and reinforcing materials are substantially pure, and the combination fiber/interface material/matrix material is selected from the group consisting of: $Al_2O_3/Al_2TiO_5/Al_2O_3$, $YAG/Al_2TiO_5/Al_2O_3$, $Al_2O_3/YAG/Al_2O_3$, $Al_2O_3/SnO_2/Al_2O_3$, $YAG/SnO_2/Al_2O_3$, $Al_2O_3/$mullite/$Al_2O_3$, and mullite/$ZrO_2$/mullite.

5 Claims, No Drawings

CERAMIC COMPOSITE, PARTICULARLY FOR USE AT TEMPERATURES ABOVE 1400 DEGREES CELSIUS

FIELD OF THE INVENTION

The present invention refers to a ceramic composite material comprising matrix and possibly reinforcing materials and an intermediate weak interface material and particularly adapted for use at temperatures above 1400° C. and in oxidizing environment, the matrix and possibly reinforcing materials consisting of the same or different ceramic oxides having a melting point above 1600° C.

BACKGROUND OF THE INVENTION

Ceramic composite materials might be divided into materials reinforced by particles, whiskers or elongated fibres. These materials are prepared by powder processes and sintering or by gas-phase infiltration. The materials hitherto mentioned in the literature often are based on the provision of desired composite characteristics by means of a weak interface material between the matrix and the reinforcing material, preferably fibres, the interface material consisting of carbon or boron nitride, see e.g. Frety, N., Boussuge, M., "Relationship between high-temperature development of fibre-matrix interfaces and the mechanical behaviour of SiC—SiC composites" Composites Sci. Techn. 37 177–189 (1990) and Singh, R. N., "Influence of high temperature exposure on mechanical properties of zircon-silicon carbide composites" J. Mater. Sci. 26 117–126 (1991), respectively.

Both carbon and boron nitride have a layered structure which makes them weak in one direction and this can be utilized for deflecting cracks along the interface between fibre and matrix. Both carbon and boron nitride, however, are very sensitive to oxidation which starts at relatively low temperatures of about 500°–800° C. In order to enable the use of ceramic composites at high temperatures in oxidizing atmosphere, such as in combustion chambers of gas turbines, rocket nozzles etc. other oxidation-resistant weak interface materials are required. An attempt to provide such materials has been mentioned in Carpenter, H. W., Bohlen, J. W., "Fiber coatings for ceramic matrix composites" Ceram. Eng. Sci. Proc. vol 13 9–10 (1992). In Carpenter, composites have been manufactured with SiC fibres and a layered SiC interface in an SiC matrix. Experiments also have been made with interfaces of a porous oxide in a SiC/SiC composite. However, SiC is stable in an oxidizing environment only up to 1000° C., at higher temperatures a $SiO_2$ layer always is formed on the surface in oxidizing atmosphere. Often $SiO_2$ is not stable together with other oxides but reacts therewith and forms strong bonds to adjacent materials. Therefore, $SiO_2$ does not constitute a useful interface material in the present connection. Thus there is still a need for improved composite materials which might be used in oxidizing environments at temperatures above 1400° C.

SUMMARY OF THE INVENTION

The object of the present invention is to suggest such a ceramic Composite material and the feature essentially distinguishing the invention is that the interface material consists of one or more ceramic oxides not exhibiting solid solubility, eutecticum below the temperature of manufacture, use or reaction with any of the matrix or possibly reinforcing materials and in combination with the materials providing a stress field liable to micro-cracking, the matrix and reinforcing materials being substantially pure.

DETAILED DESCRIPTION OF THE PREFERRED EMBODIMENTS

One of the most obvious interface materials is $ZrO_2$ which fulfills the requirements as to oxidation resistance and good high temperature characteristics. In U.S. Pat. No. 4,732,877 an interface of $ZrO_2$ in a composite of $Al_2O_3/Al_2O_3$ has been suggested. According to this patent, however, the only object of $ZrO_2$ is to act as a diffusion barrier and prevent a reaction between reinforcing fibres and matrix. The interface obtained is strong by its binding to the materials and not weak as is necessary in ceramic composites for the present use.

Thus the present invention refers to an interface material for a ceramic composite material in which the matrix and/or the reinforcing material consist of a ceramic oxide comprising one or more metals and having a melting point above 1600° C., the oxide not exhibiting solid solubility, eutecticum below the temperature of manufacture or use or reactivity with any of the other oxides in the interface or the matrix or reinforcing materials. Examples of such oxides are $Al_2O_3$, $ZrO_2$, $HfO_2$, $Al_2TiO_5$, $SnO_2$, $Y_2O_3$, $BeAl_2O_4$, yttrium aluminium garnet (YAG), $LaCrO_3$, mullite, BeO and $Cr_2O_3$. Preferably the reinforcing material is present as figures but also particulate and layer form are possible.

In combination with the matrix and possibly reinforcing materials the interface material has to form a stress field which either results into micro cracks in the interface material or into cracks between the latter and the matrix/reinforcing material. Alternatively, the stress field might cause crack deflection as such also without micro cracks occuring. The desired stress field occurs either by the difference in thermal expansion coefficient between the interface material and the matrix/reinforcing materials or by differences in thermal expansion coefficient between various inherent phases of the interface material. Stresses also might be generated by the fact that the interface material as such has an anisotropic structure with different thermal expansion coefficients in various crystal directions. A further possibility to form stresses is that phases of the interface material undergo a phase conversion which results in a change of volume. The interface material also might be a composite in which the two inherent phases have different elastic characteristics or different thermal expansion coefficients which creates the desired stress situation. Examples of some well-serving interface materials are $Al_2TiO_5$, cordierite, unstabilized $ZrO_2$, $SnO_2$, $HfO_2$, mullite, YAG, YAG+$ZrO_2$, $Al_2O_3$+$ZrO_2$ and $Al_2TiO_5$+$Al_2O_3$. Of said substances, $Al_2TiO_5$ and cordierite act as interface materials due to their anisotropy, while $ZrO_2$ and $SnO_2$ act by micro-cracks. YAG, $HfO_2$, $ZrO_2$, $Al_2TiO_5$, cordierite, mullite and $SnO_2$ act as interface materials due to differences in thermal expansion while $ZrO_2$ and possibly $HfO_2$ might be subjected to phase conversion. Preferably, the interface material has a thickness of at least 2 μm. When the interface material is $ZrO_2$, it is used in the form of powder or sol during coating of a fibre reinforcing material in order to avoid Chemical binding of $ZrO_2$ to the fibres.

Based on the above mentioned, the following examples of well-serving composite systems of reinforcing material/interface/matrix might be mentioned.

| | |
|---|---|
| $Al_2O_3/Al_2TiO_5/Al_2O_3$ | $YAG/Al_2TiO_5/YAG$ |
| $Al_2O_3/Al_2TiO_5/YAG$ | $YAG/Al_2TiO_5/Al_2O_3$ |
| $Al_2O_3/ZrO_2/Al_2O_3$ | $YAG/ZrO_2/YAG$ |
| $YAG/ZrO_2/Al_2O_3$ | $Al_2O_3/ZrO_2/YAG$ |

-continued

| | |
|---|---|
| $Al_2O_3/HfO_2/Al_2O_3$ | $YAG/HfO_2/YAG$ |
| $Al_2O_3/HfO/YAG$ | $YAG/HfO_2/Al_2O_3$ |
| $HfO_2/Al_2TiO_5/HfO_2$ | $Al_2O_3/YAG/Al_2O_3$ |
| $Al_2O_3/SnO_2/Al_2O_3$ | $YAG/SnO_2/YAG$ |
| $YAG/SnO_2/Al_2O_3$ | $Al_2O_3/SnO_2/YAG$ |
| $Al_2O_3/mullite/Al_2O_3$ | $mullite/ZrO_2/mullite$ |
| $YAG/Al_2O_3+ZrO_2/YAG$ | $Al_2O_3/YAG+ZrO_2/Al_2O_3$ |
| $YAG/Al_2O_3+Al_2TiO_5/YAG$ | $HfO_2/Al_2O_3+Al_2TiO_5/HfO_2$ |

EXAMPLE 1

Plates of $Al_2O_3$ of 0,25 mm thickness were coated with a thin layer of $Al_2TiO_5$. This was made by submerging the plates in a slurry of $Al_2TiO_5$ powder in water. After drying the covered plates were stacked and sintered by hot-pressing at 1700° C. for 4 hours. After sintering the $Al_2TiO_5$ layer was about 5 μm thick. The $Al_2TiO_5$ layer comprised micro cracks deflecting cracks, which was proved by diamond indentation or bending tests.

EXAMPLE 2

Fibres of $Al_2O_3$ (ALMAX, Mitsui, Japan) were covered with a thin layer of $Al_2TiO_5$. This was made by immersing the fibres into a Al—Ti-alkoxide. After gelling and drying the coated fibres were stacked in a plaster mold and a $Al_2O_3$ powder slurry was poured thereon.

After drying the slip-cast bodies were sintered by hot-pressing at 1500° C. for 4 hours. After sintering the $Al_2TiO_5$ layer was about 3 μm thick. The $Al_2TiO_5$ layer comprised micro-cracks deflecting cracks which was proved by diamond indentation or bending tests.

EXAMPLE 3

Plates of $Al_2O_3$ of 0,25 mm thickness were coated with a thin layer of $ZrO_2$. This was made by immersing the plates in a slurry of $ZrO_2$-powder in water. After drying the coated plates were stacked and sintered by hot-pressing at 1700° C. or 4 hours. The $ZrO_2$ layer had a thickness of about 5 μm after sintering. Stress-induced micro cracks occurred between the layer and the $Al_2O_3$-material. These deflected cracks which was proved by diamond indentation or bending tests.

EXAMPLE 4

Plates of $AL_2O_3$ of 0,25 mm thickness were coated with a thin layer of $HfO_2$. This was made by immersing the plates in a slurry of $HfO_2$-powder in water. After drying the coated plates were stacked and sintered by hot-pressing at 1700° C. for 4 hours. The layer of $HfO_2$ was about 5 μm thick after sintering. Stress-induced micro-cracks occurred between the layer and the $Al_2O_3$-material. These deflected cracks, which was proved by diamond indentation or bending tests.

EXAMPLE 5

Single-crystal-fibres of $Al_2O_3$ (from Saphicon, USA) were coated with a thin layer of $ZrO_2$. This was made by immersing the fibres in an aqueous $ZrO_2$-sol. After gelling and drying the coated fibres were stacked in a plaster mold and an $Al_2O_3$-powder slurry was poured thereon. After drying the slip-cast bodies were sintered by hot-pressing at 1500° C. for 4 hours. After sintering the $ZrO_2$ layer was about 3 μm thick. Stress-induced micro-cracks occurred between the layer and the $Al_2O_3$-material. These deflected cracks which was proved by diamond indentation or bending tests.

EXAMPLE 6

Plates of $Al_2O_3$ of 0,25 mm thickness were coated with a thin layer of $SnO_2$. The plates were immersed in $SnO_2$-sol and stacked on each other and then dried after which they were sintered in air at 1450° C. under a certain uniaxial pressure for 4 hours. After sintering the $SnO_2$-layer was about 2,5 μm thick. The $SnO_2$-layer formed micro-cracks deflecting cracks which was proved by diamond indentation or bending tests.

We claim:

1. A ceramic composite material comprising matrix material, reinforcing fibers and an intermediate interface material, wherein said matrix material and reinforcing fibers consists of the same or different ceramic oxides having a melting point above 1600° C.; said interface material being applied as a coating on said fibers and consisting of at least one ceramic oxide not exhibiting solid solubility, eutecticum below the temperature of manufacture or use or reactivity with any of said matrix or reinforcing materials; said matrix and reinforcing materials being substantially pure, and wherein the combination fiber/interface material/matrix material, respectively, is selected from the group consisting of:

| | |
|---|---|
| $Al_2O_3/Al_2TiO_5/Al_2O_3$, | $YAG/Al_2TiO_5/Al_2O_3$, |
| $Al_2O_3/YAG/Al_2O_3$, | $Al_2O_3/SnO_2/Al_2O_3$, |
| $YAG/SnO_2/Al_2O_3$, | $Al_2O_3/mullite/Al_2O_3$. |

2. A composite material according to claim 1, wherein a beneficial stress field for enhancing the debonding is formed either by differences in thermal expansion coefficient between the interface material and the matrix and reinforcing fibers or between various inherent phases in the very interface material; or by the latter as such having anisotropic structure with different thermal expansion coefficient in different crystal directions; or by providing a phase conversion between the phases of the interface material and hence a volume change or by the interface material being a composite having at least two phases which have different elastic characteristics or different thermal expansion coefficients.

3. A composite material according to claim 1, wherein said interface material is in the form of powder or sol in order to avoid chemical bonding of the interface material to the reinforcing fibers and/or the matrix material during fiber coating.

4. A composite material according to claims 1 wherein said interface material has a thickness of at least 2 um.

5. The composite material of claim 1 being capable of use at temperatures above 1400° C. and in an oxidizing environment for obtaining a weak bond liable to debonding between the interface material and matrix material and/or reinforcing fibers, respectively.

* * * * *